3,423,505
RABIES VACCINE AND PROCESS FOR PREPARATION THEREOF
John F. Crawley, Weston, Ontario, and Melvin Kenneth Abelseth, Willowdale, Ontario, Canada, assignors to The Governors of the University of Toronto, Toronto, Ontario, Canada, a corporation of Canada
No Drawing. Filed Nov. 12, 1964, Ser. No. 410,732
Claims priority, application Canada, Oct. 31, 1964, 915,362
U.S. Cl. 424—89                                12 Claims
Int. Cl. A61k 23/00; C12k 5/00

ABSTRACT OF THE DISCLOSURE

A process for producing rabies vaccine for immunizing animals and the rabies vaccine per se in which the ERA strain of rabies virus ATCC VR 332 is propagated in live kidney cells obtained from pigs or dogs by tissue cell techniques with a resulting rabies virus-containing solution (vaccine) substantially free from contaminants (either viral or bacterial).

---

Background of invention

In the treatment of man, the rabies vaccine now frequently used is described as modified Semple vaccine. This vaccine consists of a suspension of fixed rabies virus prepared from the brains of animals and inactivated with phenol. In the immunization of animals such as cattle, dogs, cats, etc., the rabies vaccine termed Flury vaccine is used. This vaccine is a live attenuated preparation and is produced by growing a suitable strain of the virus in embryonic chicks. Thus, in either instance, the preparation which is injected consists of the virus and of a relatively large amount of the tissue in which the virus was grown; that is, brain suspension in the case of the Semple vaccine or embryonic chicks in the case of the Flury vaccine. It has been observed that in the case of the Semple vaccine, the daily dose of rabid brain tissue administered to a human subject may be as much as 80 milligrams. The amount of virus protein which is administered is very small in comparison. An objection to such vaccines is that a relatively large amount of undesirable protein to which the person or animal being treated or immunized may be sensitive, is administered with the relatively small amount of active virus. It is well known that any reaction to these proteins is very painful and may be harmful.

Description of the invention

An object of this invention is to provide a new strain of rabies virus which is immunogenic and not pathogenic to the subject to be immunized against rabies.

Another object of this invention is to provide an immunogenic strain of rabies which is adapted to grow on tissue cultures and furthermore, which is particularly effective in immunization.

A further object of this invention is to provide a rabies vaccine which is substantially free of undesirable protein.

An even further object of this invention is to provide a rabies vaccine in which the chance occurrence of a contaminant (either viral or bacterial) has been considerably reduced from that in vaccines produced by other methods.

The vaccine of this invention has been tested in several species of animals and shown to be effective to immunize these animals against rabies. From the results of these tests, it is contemplated that the vaccine may be used to treat man without harmful effect.

Our colleague, Dr. Paul Fenje has adapted a strain of rabies fixed virus designated SAD to grow in hamster kidney tissue (Canadian Journal of Microbiology 6, 606, 1960). We obtained a sample of virus from Dr. Fenje and adapted it for growth in cells such as dog or pig kidney cells as hereinafter described.

We have successfully grown rabies virus in tissue culture technique in good yields and on a large scale which fulfills the objects of this invention. Among the cells which we have used, and which are usually available at any time of the year, are dog kidney cells and pig kidney cells. Pig kidney cells are preferred partly because pig kidney cells are available all times of the year and in large quantities. Moreover, in practicing the invention, it is desirable to use cells from a species unlikely to be infected with a disease which may be found in the species to be vaccinated. It is preferable to use cells from minimal disease herds.

One method of adapting this strain for growth in kidney cells, for example, in pig kidney cells, is first to grow it in fertile eggs, preferably for several, such as ten, passages; then, after transfer through pig kidney cells at least once, we call this virus strain the ERA strain of rabies virus. A sample of the ERA strain of virus was deposited with the American Type Culture Collection, Washington, D.C., on the 29th day of October 1964, and is recorded there as Number VR332.

The pig kidneys which we select for use in our process are those which we obtain from young pigs, including foetal pigs, delivered from the sow by Caesarian section or by natural birth, desirably from a minimal disease herd. In this way, we are able to obtain kidney tissue which can be maintained and grown by tissue cell techniques and which has the desirable quality of being free from contaminants, such as hog cholera or other pig diseases.

In producing our vaccine, the ERA strain of rabies virus is passed many times, for example 20 times, through pig kidney cells. The titre of vaccine produced at the fourth pig kidney passage is about $10^{-2.5}$ and at the 20th passage the titre has increased in a most unexpected and highly satisfying way to $10^{-5.5}$. (In speaking of titre, we refer to $LD_{50}$ of our virus determined by injecting intracerebrally dilutions thereof in a quantity of 0.03 ml. per 10–15 gram mouse.) A satisfactory vaccine may be obtained from as early as the eighth passage through kidney cells wherein a titre as high as $10^{-4}$ was obtained. When we anticipate that we have a high titre, we remove the fluid containing the living virus from the suspension of kidney cells simply by decanting the fluid therefrom. The fluid containing the virus has an extremely low content of foreign protein thus being differentiated sharply from Semple vaccine and Flury vaccine. Indeed, the fluid which we obtain consists essentially of the salts and other components added in the tissue culture technique to permit the growth of kidney cells and that component which we are so anxious to achieve, namely, the ERA strain rabies virus. This fluid may be used in undiluted form but because of its high titre, it may be diluted many fold with saline or other suitable diluent. We have achieved remarkable success in the protection of cattle and other animals against challenge doses of rabies virus even when we have diluted our vaccine as much as 100-fold. It may be stored for an indefinite period in frozen or dried form.

The following are examples of the process of the invention:

EXAMPLE 1

Kidneys were removed from a pig, four to six weeks of age. The pig was one which had been Caesarian derived. The tissue was trypsinized for tissue culture. Growth media used was anks and Lactalbumin Hydrolysate (Proceedings of the Society for Experimental Biology and Medicine, 81, 208, 1952, more specifically described as Hanks' Salt Solution, Streptomycin, Phenol Red and Lactalbumin Hydrolysate 0.5%), with 5% bovine serum and 1% sodium bicarbonate plus 200 units of penicillin per ml. of the total volume. The media was seeded with the trypsinized kidney cells in an amount to provide 1 ml. of packed cells per 1,000 ml. of growth media. The cells were then grown in Blake bottles, 100 ml. of cell suspension being allotted to each bottle. The bottles were incubated at 37° C. until there was a complete monolayer of cells. This required a period of approximately five days. The media was then changed to a maintenance media—Hanks' and lactalbumin hydrolysate with 2% bovine serum and 5% sodium bicarbonate plus 200 units of penicillin per ml. of the total volume.

One day later, the cells were infected with rabies virus, that is, the ERA strain of rabies virus otherwise known as inoculum rabies virus ATCC VR332, which had been through 15 kidney cell passages. Each bottle containing 100 ml. of media was inoculated with 2.5 ml. of inoculum.

On the third day, the fluid was removed, discarded and replaced by fresh media. This was repeated on the seventh day.

Fresh media was put on the cells at the 3rd, 7th and 10th days. The infected fluid changes from the 3rd and 7th days were discarded. On the 10th and the 14th day, the fluid changes were harvested under sterile conditions (that from the 10th day being replaced by fresh media) and a portion of each harvested fluid change was diluted with an equal volume of a menstruum suitable for this purpose; for example, a menstruum comprising 5% skim milk powder and 0.5% sucrose in water. The diluted fluid changes were then freeze-dried in 14 ml. amounts.

Other aliquots from the 10th and the 14th day fluid changes were frozen with solid carbon dioxide and later thawed. Each sample was diluted in an equal volume of sterile distilled water containing normal horse serum to a concentration of 2%, to have these samples comparable with the dried product in respect of dilution. Serial ten-fold dilutions were made using sterile distilled water plus 2% normal horse serum as diluent. Six mice were inoculated per dilution and each mouse received an intracerebral inoculation of 0.03 ml. The $LD_{50}$ in mice inoculated with fluid change from the 10th and 14th day was found to be $10^{-4.62}$ and $10^{-4.58}$ respectively.

After freeze-drying, the $LD_{50}$ in mice was again determined. Two vials from the 10th day fluid change and two vials from the 14th day fluid change were picked at random. Each vial was reconstituted with 14 ml. of sterile distilled water. Using this suspension, serial ten-fold dilutions were made with sterile distilled water and 2% normal horse serum as diluent. The $LD_{50}$ titres in mice immediately after freeze-drying were determined to be $10^{-4.36}$ for the 10th day and $10^{-4.5}$ for the 14th day.

EXAMPLE 2

Pig kidney cells were prepared as previously discribed. In four days, the monolayer of cells was complete and the growth media was changed to the maintenance media.

One day later, bottles containing 100 ml. of media were inoculated with 2.5 ml. of ERA strain of rabies virus, in its 29th serial pig kidney passage, 10th day fluid change.

Fresh media was put on the cells at the 6th day. The fluids from the 6th and the 10th day were harvested under sterile conditions, and a portion was diluted with an equal volume of a menstruum comprising 5% skim milk powder and 0.5% sucrose in water. It was then freeze-dried in 14 ml. amounts.

Other aliquots from the 6th and the 10th day fluid changes were frozen with solid carbon dioxide and later thawed. Each sample was then diluted with an equal volume of sterile distilled water plus 2% of normal horse serum, so that these samples were comparable with the dried product in respect to dilution. Serial ten-fold dilutions were made using sterile distilled water plus 2% of normal horse serum as diluent. Six mice were inoculated per dilution and each mouse received an intracerebral inoculation of 0.03 ml. The $LD_{50}$ titres for mice inoculated with fluid changes from the 6th and 10th day were calculated to be $10^{-4.0}$ and $10^{-4.5}$ respectively.

Immediately after freeze-drying, the $LD_{50}$ titres for mice were again determined. Two vials from the 6th day and two vials from the 10th day were taken at random. Each vial was reconstituted with 14 ml. of sterile distilled water. From each of the 6th day vials, an equal portion was removed and pooled. A 10th day pool was similarly prepared. Serial ten-fold dilutions of these suspensions were then prepared in distilled water plus 2% of normal horse serum and injected into mice as previously described. The $LD_{50}$ titres were calculated to be $10^{-3.5}$ for the 6th day and $10^{-3.8}$ for the 10th day.

The following experiments demonstrate the protection afforded by our rabies vaccine.

Experiment 1

In this experiment a group of 15 cattle, one year old, was divided into three sub-groups of five cattle each. The first sub-group received by intramuscular injection 3.0 ml. of our vaccine produced by tissue culture utilizing dog kidney. The second sub-group received a like dose of our vaccine produced by tissue culture utilizing pig kidney. The third sub-group received no vaccine and served as the control.

One month later each of the animals received by intramuscular injection, 2.0 ml. of rabies virus having a titre of $10^{-4.16}$. (This virus, a challenge rabies virus, is a suspension of salivary gland from foxes dead of rabies.) All the controls died; all the animals which received either of our vaccines survived.

Experiment 2

This experiment involved 20 cattle, of one year of age, five groups of four cattle each, one of these groups serving as a control. The vaccine was produced by our method and dried from the frozen state. The dosage was as noted in the table below. After one month the animals were challenged as in Experiment 1, using 2 ml. of challenge virus having a titre of $10^{-4}$ determined as before. The results were as follows:

| Vaccine | Volume (cc.) | No. | Survived |
|---|---|---|---|
| Undiluted | 3 | 4 | 4/4 |
| 1/10 dilution | 3 | 4 | 4/4 |
| 1/100 dilution | 3 | 4 | 4/4 |
| 1/1,000 dilution | 3 | 4 | 1/4 |
| Controls | | 4 | 0/4 |

Thus it will be seen that our vaccine even when diluted one-thousandfold gave some protection with positive protection even when diluted one-hundredfold.

Experiment 3

This experiment was designed to show a use for our vaccine in the protection of sheep from rabies. In this case, the control involved seven unvaccinated sheep. The vaccine was freeze-dried. The amount injected was 3.0 ml. of the reconstituted vaccine and one month later all animals received intramuscularly a challenge dose of 2.0 ml. of rabies virus having a titre of $10^{-4.66}$ determined as before. The results were as follows:

| Vaccine | Volume (cc.) | No. | Survived |
|---|---|---|---|
| Undiluted | 3 | 5 | 5/5 |
| 1/10 dilution | 3 | 5 | 5/5 |
| 1/100 dilution | 3 | 5 | 5/5 |
| 1/1,000 dilution | 3 | 5 | 4/5 |
| Controls | | 7 | 1/7 |

Thus it is clear that our vaccine, even when diluted one-thousandfold has afforded marked protection against rabies and complete protection when diluted one-hundred-fold.

Experiment 4

This experiment was similar to the previous experiments but was designed to show the effectiveness of our vaccine in protecting dogs against rabies. The various groups of dogs, one year old, are shown in the table. The dose of vaccine (freeze-dried) was 2 ml. intramuscularly. After five weeks, the dogs were challenged by the intramuscular administration of 2.0 ml. of rabies virus having a titre of $10^{-4.83}$, measured as before. The results were as follows:

| Vaccine | Volume (cc.) | No. | Survived |
|---|---|---|---|
| Undiluted | 2 | 4 | 4/4 |
| 1/10 dilution | 2 | 4 | 4/4 |
| 1/100 dilution | 2 | 4 | 4/4 |
| 1/1,000 dilution | 2 | 4 | 3/4 |
| Controls | | 4 | 0/4 |

Thus, it can be seen that all unvaccinated dogs died whereas our vaccine diluted 1:1000 gave significant protection and complete protection when diluted 1:100.

Experiment 5

Sixty-eight dogs from 2-4 months of age were vaccinated with our tissue culture vaccine with dosage of 2 cc. administered intramuscularly. Two different lots of vaccine were used. Two months later all vaccinates and sixteen control dogs were challenged as before with rabies virus with the following results:

| | No. | Survived |
|---|---|---|
| Vaccinates | 68 | 67/68 |
| Controls | 16 | 0/16 |

What we claim as new and desire to protect by Letters Patent of the United States is:

1. A process for the preparation of rabies virus composition adapted for introduction into the body of an animal in order to confer immunity against subsequent infection by rabies virus comprising:
    (a) infecting a culture of live kidney cells derived from pigs in a maintenance medium solution with ERA strain rabies virus ATCC VR332,
    (b) allowing the virus to multiply in said culture for several days, and
    (c) separating the kidney cells from the solution and harvesting the resulting virus-containing solution.

2. A process for the preparation of rabies virus solution according to claim 1 in which the maintenance medium is a solution comprising Hanks' salt solution and lactalbumin hydrolysate with 2% bovine serum, 5% sodium bicarbonate and 200 units of pencillin per ml. of total volume.

3. A process for the preparation of live rabies vaccine comprising:
    (a) infecting a culture of viable pig kidney tissue in a maintenance culture medium with ERA strain rabies virus ATCC VR 332,
    (b) allowing the virus to multiply in said culture for several days,
    (c) separating said culture medium infected with said virus from said tissue culture,
    (d) replacing said culture medium with a fresh maintenance culture medium,
    (e) repeating steps (b), (c) and (d) until a virus infected culture medium having an $LD_{50}$ titre in mice of at least $10^{-3}$ is obtained, and
    (f) separating the tissue from the culture medium and harvesting the resulting virus-containing culture medium.

4. A process for the preparation of rabies virus solution adapted for introduction into the body of an animal in order to confer immunity against subsequent infection by rabies virus according to claim 3 comprising:
    (g) repeating steps (b), (c) and (d) until a virus infected medium having an $LD_{50}$ titre in mice of at least $10^{-3}$ is obtained, and
    (h) separating the kidney cells from the solution obtained in step (g) and harvesting the resulting virus-containing solution having an $LD_{50}$ titre in mice of at least $10^{-3}$.

5. A process for the preparation of rabies virus solution according to claim 3 in which said high titre infected virus-containing solution is diluted with a menstruum comprising about 5% skim milk powder and about 0.5% sucrose in water and freeze-drying for storage.

6. A process for the preparation of rabies virus solution according to claim 3 wherein steps (b), (c) and (d) are repeated at least 8 times.

7. A live rabies vaccine comprising a strain of rabies virus ATCC VVR 332 in a pharmaceutically acceptable injectable fluid.

8. The vaccine of claim 7 wherein the pharmaceutically acceptable injectionable fluid is a medium solution used in the culturer of live dog kidney cells.

9. The vaccine of claim 7 wherein the pharmaceutically acceptable injectionable fluid is a medium solution used in the culture of live pig kidney cells.

10. A process for the preparation of live rabies vaccine comprising the steps of introducing ERA strain rabies virus ATCC VR 332 into a tissue culture maintenance medium containing viable cells of dog kidney tissue, incubating said tissue culture medium by tissue culture techniques, removing the kidney cells and then harvesting the resulting rabies virus-containing solution.

11. A process for the preparation of live rabies vaccine comprising the steps of introducing ERA strain rabies virus ATCC VR 332 into a tissue culture maintenance medium containing viable cells of pig kidney tissue, incubating said tissue culture medium by tissue culture techniques, removing the kidney cells and then harvesting the resulting rabies virus-containing solution.

12. A process for the preparation of live rabies vaccine comprising:
    (a) infecting a culture of viable dog kidney tissue in a maintenance culture medium with ERA strain rabies virus ATCC VR 332;
    (b) allowing the virus to multiply in said culture for several days;
    (c) separating said culture medium infected with said virus from said tissue culture;
    (d) replacing said culture medium with a fresh maintenance culture medium;
    (e) repeating steps (b), (c) and (d) until a virus infected culture medium having an $LD_{50}$ titre in mice of at least $10^{-3}$ is obtained; and
    (f) separating the tissue from the culture medium and harvesting the resulting virus-containing culture medium.

References Cited

Abelseth: (I), Canadian Veterinary Journal, vol. 5, No. 4, pp. 84–87, April, 1964, 167–78 vk.

Abelseth: (II), Canadian Veterinary Journal, vol. 5, No. 11, pp. 279–286, Nov. 1, 1964, 167–78 vk.

RICHARD L. HUFF, *Primary Examiner.*

U.S. Cl. X.R.

195—1.1, 1.2, 1.3

UNITED STATES PATENT OFFICE
CERTIFICATE OF CORRECTION

Patent No. 3,423,505　　　　　　Dated January 21, 1969

Inventor(s): John F. Crawley and Melvin K. Abelseth

It is certified that error appears in the above-identified patent and that said Letters Patent are hereby corrected as shown below:

Delete the first "V" in line 2 of claim 7.

Signed and sealed this 11th day of February 1975.

(SEAL)
Attest:

RUTH C. MASON
Attesting Officer

C. MARSHALL DANN
Commissioner of Patents
and Trademarks